(12) United States Patent
Qiu et al.

(10) Patent No.: US 10,674,684 B2
(45) Date of Patent: Jun. 9, 2020

(54) BOAT-SHAPED SPRINKLER IRRIGATION MACHINE FOR LARGE-SCALE FARM IRRIGATION CANALS

(71) Applicants: JIANGSU HUAYUAN WATER-SAVING CO., LTD, Jiangsu (CN); China University of Mining and Technology, Jiangsu (CN)

(72) Inventors: Zhipeng Qiu, Jiangsu (CN); Tao Peng, Jiangsu (CN); Peiyong Liu, Jiangsu (CN); Yuanguang Liu, Jiangsu (CN); Jielin Shi, Jiangsu (CN); Qi Liu, Jiangsu (CN); Zhencai Zhu, Jiangsu (CN); Fan Jiang, Jiangsu (CN)

(73) Assignees: JIANGSU HUAYUAN WATER-SAVING CO., LTD, Jiangsu (CN); China University of Mining and Technology, Jiangsu (CN)

( * ) Notice: Subject to any disclaimer, the term of this patent is extended or adjusted under 35 U.S.C. 154(b) by 0 days.

(21) Appl. No.: 16/472,207

(22) PCT Filed: Jun. 25, 2018

(86) PCT No.: PCT/CN2018/092578
§ 371 (c)(1),
(2) Date: Jun. 21, 2019

(87) PCT Pub. No.: WO2019/200703
PCT Pub. Date: Oct. 24, 2019

(65) Prior Publication Data
US 2020/0137968 A1    May 7, 2020

(30) Foreign Application Priority Data
Apr. 20, 2018  (CN) .......................... 2018 1 0358549

(51) Int. Cl.
*A01G 25/16* (2006.01)
*A01G 25/09* (2006.01)

(52) U.S. Cl.
CPC ........... *A01G 25/097* (2013.01); *A01G 25/16* (2013.01)

(58) Field of Classification Search
CPC ........ A01G 25/097; A01G 25/16; B63H 1/00; B63H 20/14
(Continued)

(56) References Cited
U.S. PATENT DOCUMENTS 1,263,052 A * 4/1918 Fowler ..................... B63H 5/16
                                                     440/70
1,662,301 A * 3/1928 Coykendall .............. F16H 1/22
                                                     440/75
(Continued)

FOREIGN PATENT DOCUMENTS

| CN | 2361075 | 2/2000 |
|---|---|---|
| CN | 2378924 | 5/2000 |

(Continued)

OTHER PUBLICATIONS

"International Search Report (Form PCT/ISA/210) of PCT/CN2018/092578," dated Jan. 25, 2019, pp. 1-5.

*Primary Examiner* — Stephen P Avila
(74) *Attorney, Agent, or Firm* — JCIPRNET

(57) ABSTRACT

A boat-shaped sprinkler irrigation machine is adapted for large-scale farm irrigation canals, and includes a hull, a traveling propulsion device, a sprinkler irrigation device, and an electric control device. A sprinkler irrigation auxiliary support mechanism is disposed on the hull, and comprises support legs and support roller groups. The support legs are symmetrically disposed on left and right sides of the hull, and top ends of the support legs are mounted on the hull. The support roller groups are mounted on bottom ends (Continued)

of the support legs. The support roller group comprises support rollers. The sprinkler irrigation device comprises a self-priming pump, a sprinkler frame, and a sprinkler gun. The sprinkler frame is fixedly mounted on the hull in a position corresponding to a symmetrical center of the support legs, and the sprinkler gun is fixedly mounted on the sprinkler frame by means of an adjusting assembly.

10 Claims, 3 Drawing Sheets

(58) Field of Classification Search
    USPC ..................................................... 440/39, 75
    See application file for complete search history.

(56) References Cited

U.S. PATENT DOCUMENTS

| | | | | |
|---|---|---|---|---|
| 1,804,882 | A * | 5/1931 | Longstreet | B63H 20/14 475/306 |
| 1,943,152 | A * | 1/1934 | Weiss | A01G 25/097 239/1 |
| 2,065,733 | A * | 12/1936 | Pearson | A01D 44/00 56/8 |
| 2,694,366 | A * | 11/1954 | Miller | F04B 19/14 198/702 |
| 3,460,761 | A * | 8/1969 | Tuck | A01G 25/097 239/724 |
| 3,902,668 | A * | 9/1975 | Daugherty | A01G 25/092 239/729 |
| 6,263,826 | B1 * | 7/2001 | Key | B63B 17/00 114/343 |
| 7,210,637 | B1 * | 5/2007 | Johnson | B63J 2/00 239/34 |
| 8,256,748 | B1 * | 9/2012 | Boulter | C02F 1/048 159/4.4 |

FOREIGN PATENT DOCUMENTS

| | | |
|---|---|---|
| CN | 2395536 | 9/2000 |
| CN | 2796364 | 7/2006 |
| CN | 2925073 | 7/2007 |
| CN | 203243770 | 10/2013 |
| CN | 203735061 | 7/2014 |
| CN | 205357884 | 7/2016 |

* cited by examiner

BOAT-SHAPED SPRINKLER IRRIGATION MACHINE FOR LARGE-SCALE FARM IRRIGATION CANALS

CROSS-REFERENCE TO RELATED APPLICATION

This application is a 371 of international application of PCT application serial no. PCT/CN2018/092578, filed on Jun. 25, 2018, which claims priority to and the benefit of China Patent Application No. 201810358549.6, filed on Apr. 20, 2018. The entirety of each of the above-mentioned patent applications is hereby incorporated by reference herein and made a part of this specification.

BACKGROUND

Technical Field

The present invention belongs to the technical field of sprinkler irrigation equipment, and relates to a sprinkler irrigation machine, and in particular, to a boat-shaped sprinkler irrigation machine applicable to large-scale farms with irrigation canals for sprinkler irrigation operations of farmlands.

Description of Related Art

Sprinkler irrigation is an irrigation method of sprinkling pressurized water into the air by means of a special-purpose apparatus such as a sprinkler to form water drops to the ground sprinkling surface and the surfaces of the crops. The sprinkler irrigation machine is also called a sprinkler irrigation implement and a sprinkler irrigation unit, i.e., a special-purpose apparatus for sprinkler irrigation.

To facilitate water abstraction for irrigation and sprinkler irrigation, large-scale farms generally have irrigation canals between the farmlands. A reel sprinkler irrigation machine can irrigate a large area of farmland, and can also control the amount of water spray according to the sprinkler to meet different requirements of a user for water volume of sprinkler irrigation. Therefore, the large-scale farms generally employ the reel sprinkler irrigation machine for sprinkler irrigation of crops. For the large-scale farms with irrigation canals, the sprinkler irrigation operation is generally carried out by stopping the reel sprinkler irrigation machine in the farmland near the irrigation canal, supplying the pressurized water through a water pump, dragging a sprinkler wagon connected to a PE pipe to a preset irrigation site by using a traction apparatus such as a tractor or a winch, and then turning on the water pump so that the sprinkler irrigation pressurized water enters the PE pipe to be sprayed from a sprinkler of the sprinkler wagon for sprinkler irrigation and also drives the winch to rotate, thereby achieving automatic recovery of the PE pipe.

The sprinkler irrigation method of the conventional reel sprinkler irrigation machine for the large-scale farms with irrigation canals has the following drawbacks:

1. since the reel sprinkler irrigation machine is generally hauled to the farmland to be sprinkled by the traction apparatus such as the tractor, and the farmland is often limited in space in order to ensure the largest planting area, it is difficult for the whole reel sprinkler irrigation machine to turn around, and when the sprinkler irrigation operation is completed, the turnaround will often cause the crops in the farmland to be excessively crushed.

2. The conventional reel sprinkler irrigation machine has a large width due to the provision of the reel, and in order to ensure the straight moving of the sprinkler wagon, the width of the sprinkler wagon generally matches the width of the reel. Therefore, during the sprinkler irrigation of low crops, the wheel spacing of the sprinkler wagon generally matches the size of the ridge spacing of the farmland in order to prevent crushing the crops, and the crops are also squeezed and crushed in the process of dragging the PE pipe on the ground. Moreover, for the sprinkler irrigation of high crops such as corn and sorghum, it is generally necessary to reserve a moving passage for the sprinkler wagon in the farmland at the time of planting, which causes a reduction in the planting area.

3. Since the coverage area of the sprinkler irrigation operation is generally a fan-shaped structure with the sprinkler as the symmetry center, a long water pipeline is generally required for the farmland disposed parallel to the irrigation canal.

SUMMARY

Technical Problem

In view of the foregoing problems, the present invention provides a boat-shaped sprinkler irrigation machine for large-scale farm irrigation canals, which can completely avoid crushing farmland crops while achieving sprinkler irrigation operations, and is especially suitable for the sprinkler irrigation of crops on the large-scale farms with irrigation canals.

Technical Solution

To achieve the foregoing objective, the boat-shaped sprinkler irrigation machine for large-scale farm irrigation canals comprises a hull, a driving power source, a traveling propulsion device, a sprinkler irrigation device, and an electric control device. The driving power source, the sprinkler irrigation device and the electric control device are disposed on the hull. A sprinkler irrigation auxiliary support mechanism is disposed on the hull, and comprises support legs and support roller groups. The support legs are symmetrically disposed on left and right sides of the hull, and top ends of the support legs are mounted on the hull. The support roller groups correspond in number to the support legs, and are mounted on bottom ends of the support legs. The support roller group comprises support rollers, and the support rollers are provided to roll back and forth. The traveling propulsion device comprises a propeller disposed at a bottom portion of the hull, and the propeller is connected to the driving power source via a transmission mechanism. The sprinkler irrigation device comprises a self-priming pump, a sprinkler frame, and a sprinkler gun. The self-priming pump is fixedly mounted on the hull, and a power input end of the self-priming pump is connected to the driving power source via the transmission mechanism. A suction port of the self-priming pump is connected to a suction pipe that is immerged below a liquid level of an irrigation canal, and a drainage port of the self-priming pump is connected to the sprinkler gun via a pipeline. The sprinkler frame is fixedly mounted on the hull in a position corresponding to a symmetrical center of the support legs. The sprinkler gun is fixedly mounted on the sprinkler frame by means of a sprinkler gun adjusting assembly, and the sprinkler gun adjusting assembly comprises a jet angle adjusting mechanism and a jet direction adjusting mechanism which can realize a rotary positioning operation of the sprinkler gun. The electric control device comprises a controller, a controller battery pack, a hull movement control loop, and a sprinkler irrigation control loop, and the controller is electrically connected to the driving power source.

As a further improvement of the present invention, the support leg is a telescopic structure, and comprises a body section, a telescopic section, and a support leg extension and retraction control member. A top end of the body section is mounted on the hull, the telescopic section is slidably and matingly connected to the body section, and the support leg extension and retraction control member is disposed in a length direction of the support leg. One end of the support leg extension and retraction control member is connected to the body section, and the other end of the support leg extension and retraction control member is connected to the telescopic section. A telescopic lifting control member is further disposed between the support leg and the hull. Two ends of the telescopic lifting control member are hingedly connected to the hull and the body section of the support leg, respectively. The electric control device further comprises a support leg lifting control loop and a support leg extension and retraction control loop, and the controller is electrically connected to the support leg extension and retraction control member and the telescopic lifting control member, respectively.

As a preferred version of the present invention, the telescopic lifting control member and the support leg extension and retraction control member are both hydraulic cylinder structures. The boat-shaped sprinkler irrigation machine for large-scale farm irrigation canals further comprises a hydraulic control device disposed on the hull. The hydraulic control device comprises a hydraulic pump station and a hydraulic control valve group. The hydraulic pump station comprises a hydraulic pump and a hydraulic oil tank. The hydraulic pump of the hydraulic pump station is connected to the driving power source via the transmission mechanism, and the hydraulic pump station is connected to the hydraulic control valve group via a hydraulic pipeline. The hydraulic control valve group is connected to the telescopic lifting control member and the support leg extension and retraction control member via the hydraulic pipeline, respectively. The hydraulic control valve group is electrically connected to the controller of the electric control device.

As a further improvement of the present invention, the support roller group further comprises a support roller drive, and an output end of the support roller drive is coaxially and fixedly connected to the support rollers. The electric control device further comprises a support roller drive control loop. The controller is electrically connected to the support roller drive.

As a preferred version of the present invention, the support roller drive is a roller hydraulic motor. The boat-shaped sprinkler irrigation machine for large-scale farm irrigation canals further comprises a hydraulic control device disposed on the hull. The hydraulic control device comprises a hydraulic pump station and a hydraulic control valve group. The hydraulic pump station comprises a hydraulic pump and a hydraulic oil tank. The hydraulic pump of the hydraulic pump station is connected to the driving power source via the transmission mechanism. The hydraulic pump station is connected to the hydraulic control valve group via a hydraulic pipeline. The hydraulic control valve group is connected to the roller hydraulic motor via the hydraulic pipeline. The hydraulic control valve group is electrically connected to the controller of the electric control unit.

As a further improvement of the present invention, the electric control device further comprises a shipboard industrial control computer, a hull position feedback sensor, a sprinkler gun jet angle control loop, and a sprinkler gun jet direction control loop. The shipboard industrial control computer is electrically connected to the controller via a data line, and comprises a sprinkler irrigation data input/output port. The controller is electrically connected to the jet angle adjusting mechanism and the jet direction adjusting mechanism of the sprinkler gun adjusting assembly, respectively. The hull position feedback sensor is disposed at front and rear ends of the hull, and is electrically connected to the controller.

As a further improvement of the present invention, there are at least four support legs. The four support legs are symmetrically disposed with respect to a center of the hull. Two support legs near a bow are inclined to extend forwards, and two support legs near a stern are inclined to extend rearwards.

As a further improvement of the present invention, a damping compression spring having a guide slipping mechanism is further disposed between the bottom end of the support leg and the support roller group. One end of the damping compression spring is mounted on the support leg, and the other end of the damping compression spring is mounted on the support roller group.

As a preferred version of the present invention, the support roller group is a crawler wheel structure. The crawler wheel structure comprises a crawler beam and a crawler belt. The crawler beam is mounted and connected to the support leg. The support rollers are a plurality of crawler wheels hingedly mounted on the crawler beam. The crawler belt is connected end-to-end in a loop and is sleeved on the crawler wheels.

As a further improvement of the present invention, the electric control device further comprises a solar collector plate and a solar charging control loop, and the solar collector plate is electrically connected to the controller and the controller battery pack, respectively.

Advantageous Effect

Compared with the prior art, the boat-shaped sprinkler irrigation machine for large-scale farm irrigation canals has a sprinkler irrigation auxiliary support mechanism on the hull, and the sprinkler irrigation auxiliary support mechanism includes support legs symmetrically disposed on the left and right sides of the hull and support roller groups mounted at the bottom ends of the support legs. Therefore, when the boat-shaped sprinkler irrigation machine for large-scale farm irrigation canals is placed in an irrigation canal of a large-scale farm for use, the support roller groups are erected on a surface of an inclined embankment of the irrigation canal from the left and right directions of the hull by means of the support legs, and the propeller is immerged below an irrigation water surface. After the sprinkler irrigation control loop and the hull movement control loop start working, the irrigation water in the irrigation canal enters the self-priming pump through the suction pipe, is pressurized by the self-priming pump, and is sprayed by the sprinkler gun, and meanwhile, the propeller rotates to push the hull to realize the sprinkler irrigation of the crops. The sprinkler irrigation auxiliary support mechanism can not only balance the recoil of the sprinkler gun and prevent the hull from tipping over, but also provide the movement guidance of the hull and ensure that the hull always moves along a running direction of the irrigation canal. Since the top ends of the support legs are hingedly mounted on the hull, and a telescopic lifting control member is disposed between support legs and the hull, a spacing between the support legs in a lateral direction can be adjusted, thereby adapting to different irrigation canal widths. Since the support roller group further includes a support roller drive, the rotation of the support rollers can be realized, and passive rotation is converted into the active rotation, so that the support rollers can provide an auxiliary driving force during the traveling of the hull. Under the premise of the lifting operation of the telescopic lifting control member, the boat-shaped sprinkler irrigation machine for large-scale farm irrigation canals can walk on the ground. By providing a suitable slope on the irrigation canal, the boat-shaped sprinkler irrigation machine for large-scale farm irrigation canals can launch and land by itself, can completely avoid crushing the farmland crops while achieving sprinkler irrigation operations, and is especially suitable for the sprinkler irrigation of crops on the large-scale farms with irrigation canals.

DESCRIPTION OF THE EMBODIMENTS

The present invention is further described below in conjunction with the accompanying drawings (description is made below by using a bow direction of a hull 1 of the boat-shaped sprinkler irrigation machine for large-scale farm irrigation canals as the front).

Figure 1:
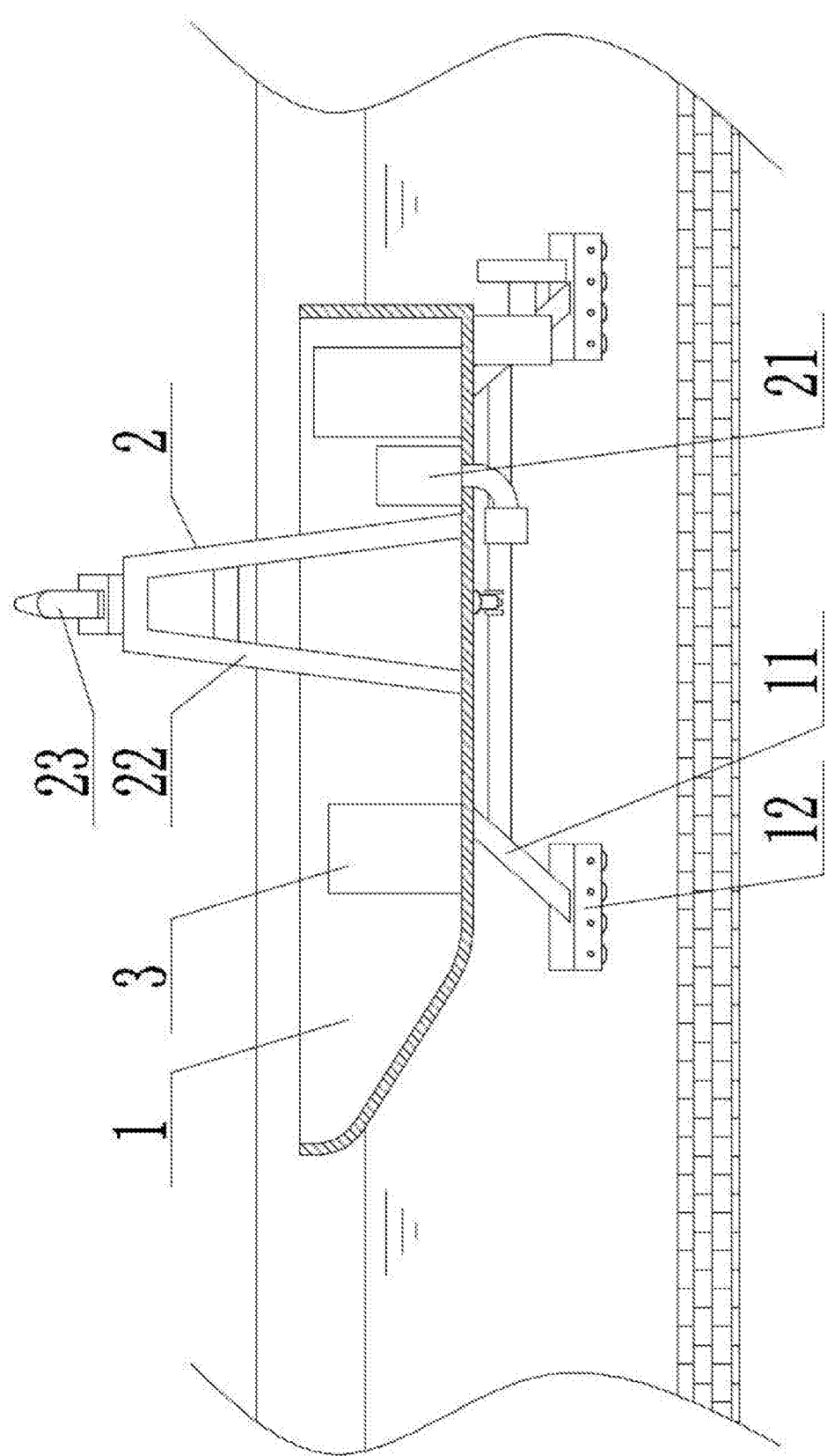
FIG. 1 is a schematic structural diagram of the present invention.
Figure 2:
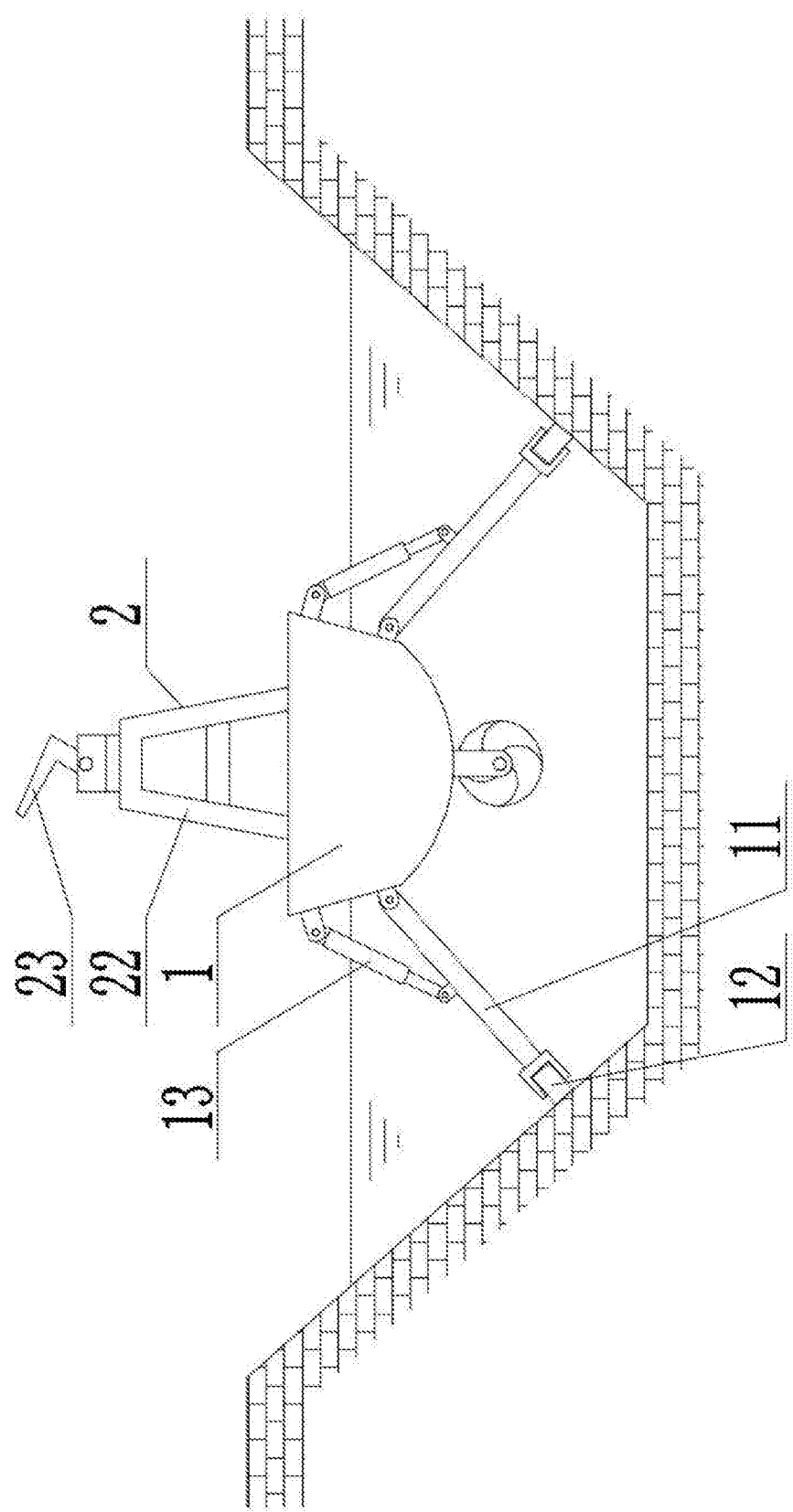
FIG. 2 is a left view of FIG. 1.
Figure 3:
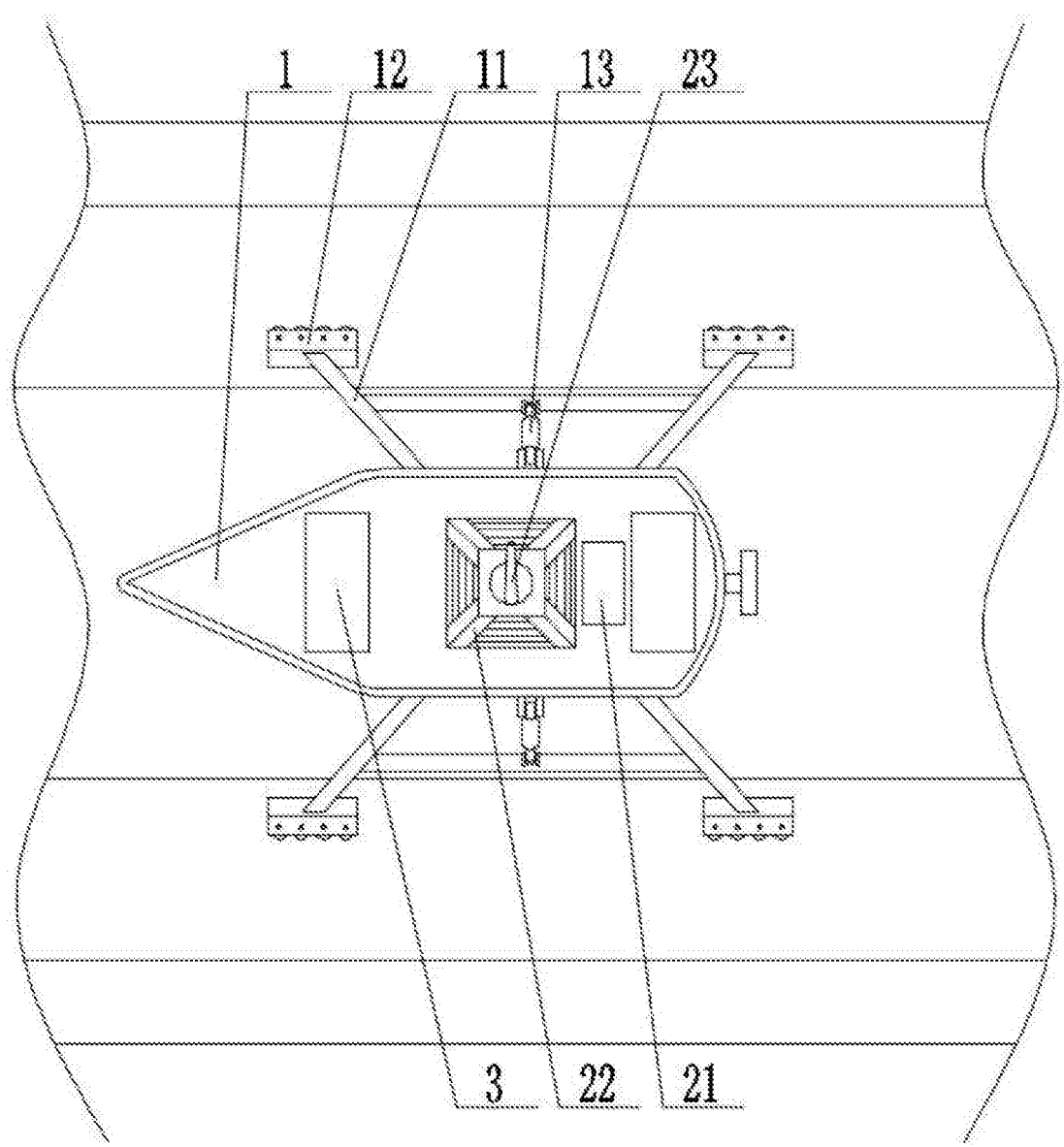
FIG. 3 is a top view of FIG. 1.

As shown in FIG. 1 to FIG. 3, the boat-shaped sprinkler irrigation machine for large-scale farm irrigation canals comprises a hull 1, a driving power source, a traveling propulsion device, a sprinkler irrigation device 2, and an electric control device 3, where the driving power source, the sprinkler irrigation device 2 and the electric control device 3 are disposed on the hull 1.

A sprinkler irrigation auxiliary support mechanism is disposed on the hull 1, and can provide auxiliary support in the sprinkler irrigation process and balance the recoil of the sprinkler gun 23. The sprinkler irrigation auxiliary support mechanism comprises support legs 11 and support roller groups 12. The support legs 11 are symmetrically disposed on left and right sides of the hull 1, and top ends of the support legs 11 are mounted on the hull 1. The support roller groups 12 corresponds in number to the support legs 11, and are mounted on bottom ends of the support legs 11. The support roller group 12 comprises support rollers, and the support rollers are provided to roll back and forth.

The driving power source is an engine system fixedly mounted on the hull 1, or a power supply system, or another power system. Taking an engine system as an example, the engine system includes an engine and a gearbox, and a power output shaft of the engine is connected to a power input shaft of the gearbox. Taking a power supply system as an example, the power supply system includes a power battery pack, a propulsion power motor, and a sprinkler irrigation power motor, and the power battery pack is electrically connected to the propulsion power motor and the sprinkler irrigation power motor, respectively.

The traveling propulsion device includes a propeller disposed at a bottom portion of the hull 1. The propeller is connected to a power output shaft of the gearbox of the engine system via a transmission mechanism, or is connected to the propulsion power motor of the power supply system. The traveling propulsion device provides propulsion power to the movement of the hull 1.

The sprinkler irrigation device 2 includes a self-priming pump 21, a sprinkler frame 22, and a sprinkler gun 23. The self-priming pump 21 is fixedly mounted on the hull 1. A power input end of the self-priming pump 21 is connected to the power output shaft of the gearbox of the engine system via the transmission mechanism, or is connected to the sprinkler irrigation power motor of the power supply system. A suction port of the self-priming pump 21 is connected to a suction pipe that is immerged below a liquid level of the irrigation canal, and a drainage port of the self-priming pump 21 is connected to the sprinkler gun 23 via a pipeline. The sprinkler frame 22 is fixedly mounted on the hull 1 in a position corresponding to a symmetrical center of the support legs 11. The sprinkler gun 23 is fixedly mounted on the sprinkler frame 22 by means of a sprinkler gun adjusting assembly. The sprinkler gun adjusting assembly includes a jet angle adjusting mechanism and a jet direction adjusting mechanism which can realize a rotary positioning operation of the sprinkler gun 23. The jet angle adjusting mechanism and the jet direction adjusting mechanism can realize rotation in a manner that, for example, a rotary motor drives a gear ring to rotate by means of a gear, or in a manner that, for example, a rotary hydraulic motor drives the gear ring to rotate by means of the gear, or by means of other rotary driving methods. The jet angle adjusting mechanism can adjust and locate the angle between the jet axis of the sprinkler gun 23 and the horizontal plane. The jet direction adjusting mechanism can adjust and locate the angle at which the sprinkler gun 23 rotates about a central axis of rotation disposed in a vertical direction.

The electric control device 3 includes a controller, a controller battery pack, a hull movement control loop, and a sprinkler irrigation control loop. The controller is electrically connected to the engine of the engine system, or is electrically connected to the propulsion power motor and the sprinkler irrigation power motor of the power supply system, respectively.

When the boat-shaped sprinkler irrigation machine for large-scale farm irrigation canals is placed in an irrigation canal of a large-scale farm for use, as shown in FIG. 2, the support roller groups 12 of the sprinkler irrigation auxiliary support mechanism are erected on a surface of an inclined embankment of the irrigation canal from left and right direction of the hull 1 by means of the support legs 11, and the propeller is immerged below an irrigation water surface. The jet angle and the jet direction of the sprinkler gun 23 are adjusted, and then the sprinkler irrigation control loop is controlled to work by the controller of the electric control device 3, and the controller controls the driving power source to drive the self-priming pump 21 to work by means of the transmission mechanism, and irrigation water in the irrigation canal enters the self-priming pump 21 through the suction pipe, is pressurized by the self-priming pump 21, and is sprayed by the sprinkler gun 23 to realize sprinkler irrigation of the farmland crops on both sides of the irrigation canal. Meanwhile, the hull movement control loop is controlled by the controller of the electric control device 3 to start to work, and the controller controls the driving power source to drive the propeller to rotate via the transmission mechanism, and the hull 1 moves under the propulsion action of the propeller. During the movement of the hull 1, the support roller groups 12 follows the hull 1 to roll on the surface of the inclined embankment of the irrigation canal. During the sprinkler irrigation operation, the sprinkler irrigation auxiliary support mechanism can not only provide sprinkler irrigation auxiliary support and balance the recoil of the sprinkler gun 23, but also provide the movement guidance of the hull 1 and ensure that the hull 1 always moves along a running direction of the irrigation canal.

To realize the universality of the boat-shaped sprinkler irrigation machine for large-scale farm irrigation canals according to different irrigation canal widths, as a further improvement of the present invention, the support leg 11 is a telescopic structure and includes a body section, a telescopic section, and a support leg extension and retraction control member. A top end of the body section is mounted on the hull 1, the telescopic section is slidably and matingly connected to the body section, and the support leg extension and retraction control member is disposed in a length direction of the support leg 11. One end of the support leg extension and retraction control member is connected to the body section, and the other end of the support leg extension and retraction control member is connected to the telescopic section. A telescopic lifting control member 13 is further disposed between the support leg 11 and the hull 1. Two ends of the telescopic lifting control member 13 are hingedly connected to the hull 1 and the body section of the support leg 11, respectively. The electric control device 3 further includes a support leg lifting control loop and a support leg extension and retraction control loop, and the controller is electrically connected to the support leg extension and retraction control member and the telescopic lifting control member 13, respectively. By controlling the extension and retraction of the telescopic lifting control member 13 and the support leg extension and retraction control member, a swinging angle and a length of the support leg 11 can be adjusted, so as to adapt to different irrigation canal widths.

The telescopic lifting control member 13 and the support leg extension and retraction control member may adopt an electric transmission mode of an electric screw rod, or a hydraulic transmission mode of a hydraulic cylinder structure. Since the electric transmission mode needs to additionally consider the insulation problem of water, and the motor is easily burned in the case of large load, while the hydraulic transmission mode can not only achieve stable support, but also avoid the foregoing problems, the hydraulic transmission mode is preferred. That is, as a preferred version of the present invention, the telescopic lifting control member 13 and the support leg extension and retraction control member are both hydraulic cylinder structures. The boat-shaped sprinkler irrigation machine for large-scale farm irrigation canals further includes a hydraulic control device disposed on the hull 1. The hydraulic control device includes a hydraulic pump station and a hydraulic control valve group, and the hydraulic pump station includes a hydraulic pump and a hydraulic oil tank. The power supply system further includes a hydraulic pump station power motor. The hydraulic pump of the hydraulic pump station is connected to the power output shaft of the gearbox of the engine system via the transmission mechanism, or is connected to the hydraulic pump station power motor of the power supply system. The hydraulic pump station is connected to the hydraulic control valve group via a hydraulic pipeline. The hydraulic control valve group is connected to the hydraulic cylinder via the hydraulic pipeline, respectively. The hydraulic control valve group is electrically connected to the controller of the electric control device 3, that is, the hydraulic cylinder is electrically connected to the controller of the electric control device 3 via the hydraulic control valve group.

Due to the viscous force of water, a moving speed of an object in water is relatively low, and under the premise of the same propulsive force, the wind and a water direction in the irrigation canal would affect the traveling speed of the hull 1. To achieve a higher moving speed, as a further improvement of the present invention, the support roller group 12 further includes a support roller drive, and an output end of the support roller drive is coaxially and fixedly connected to the support rollers. The electric control device 3 further includes a support roller drive control loop. The controller is electrically connected to the support roller drive. By controlling the rotation action of the support roller drive, the rotation of the support rollers can be realized, and passive rotation is converted into the active rotation, so that the support rollers can provide an auxiliary driving force during the traveling of the hull 1. The lifting operation of the support leg 11 is controlled by the telescopic lifting control member 13, and thus, a state that the support roller group 12 is supported on the ground and the propeller is suspended above the support roller group 12 can be realized. In this state, the boat-shaped sprinkler irrigation machine for large-scale farm irrigation canals can walk on the ground when the support roller drive is controlled to rotate. By providing a suitable slope on the irrigation canal, the boat-shaped sprinkler irrigation machine for large-scale farm irrigation canals can launch and land by itself.

The support roller drive may adopt an electric transmission mode controlled by a motor, or a hydraulic transmission mode controlled by a hydraulic motor. Since the electric transmission mode needs to additionally consider the insulation problem of water, and the motor is easily burned in the case of large load, while the hydraulic transmission mode can not only achieve stable support, but also avoid the foregoing problems, the hydraulic transmission mode is preferred. That is, as a preferred version of the present invention, the support roller drive is a roller hydraulic motor. The boat-shaped sprinkler irrigation machine for large-scale farm irrigation canals further includes a hydraulic control device disposed on the hull 1. The hydraulic control device includes a hydraulic pump station and a hydraulic control valve group, and the hydraulic pump station includes a hydraulic pump and a hydraulic oil tank. The power supply system further includes a hydraulic pump station power motor. The hydraulic pump of the hydraulic pump station is connected to the power output shaft of the gearbox of the engine system via the transmission mechanism, or is connected to the hydraulic pump station power motor of the power supply system. The hydraulic pump station is connected to the hydraulic control valve group via a hydraulic pipeline. The hydraulic control valve group is connected to the roller hydraulic motor via the hydraulic pipeline. The hydraulic control valve group is electrically connected to the controller of the electric control device 3, that is, the roller hydraulic motor is electrically connected to the controller of the electric control device 3 via the hydraulic control valve group.

The boat-shaped sprinkler irrigation machine for large-scale farm irrigation canals can be manually operated or automatically operated. To realize an automatic intelligent sprinkler irrigation operation, as a further improvement of the present invention, the electric control device 3 further comprises a shipboard industrial control computer, a hull position feedback sensor, a sprinkler gun jet angle control loop, and a sprinkler gun jet direction control loop. The shipboard industrial control computer is electrically connected to the controller via a data line, and includes a sprinkler irrigation data input/output port. The controller is electrically connected to the jet angle adjusting mechanism and the jet direction adjusting mechanism of the sprinkler gun adjusting assembly, respectively. The hull position feedback sensor is disposed at front and rear ends of the hull 1, and is electrically connected to the controller. An operator inputs the sprinkler irrigation data into the shipboard industrial control computer via the sprinkler irrigation data input/output port. The shipboard industrial control computer issues an instruction according to the specific sprinkler irrigation angle and the sprinkler irrigation direction, so that the controller controls the jet angle adjusting mechanism and the jet direction adjusting mechanism to locate the sprinkler gun 23 at the correct sprinkler irrigation angle and sprinkler irrigation direction, and then the shipboard industrial control computer issues an instruction according to the specific sprinkler irrigation distance and precipitation, so that the controller controls the hull movement control loop and the sprinkler irrigation control loop to start to work, and the propeller operates according to the set rotating speed, and the self-priming pump 21 operates according to the set flow rate. The shipboard industrial control computer issues an instruction when the hull position feedback sensor feeds back that the hull 1 moves to the set sprinkler irrigation distance, so that the controller controls the hull movement control loop and the sprinkler irrigation control loop to stop working, that is, the sprinkler irrigation operation is completed.

To further ensure the stability of the movement and sprinkler irrigation operation of the hull 1, as a further improvement of the present invention, as shown in FIG. 3, there are at least four support legs 11. The four support legs 11 are symmetrically disposed with respect to a center of the hull 1, and two support legs 11 near a bow are inclined to extend forwards, and two support legs 11 near a stern are inclined to extend rearwards. The four support legs 11 which are inclined to extend forwards and backwards can increase the stability of the movement and sprinkler irrigation operation of the hull 1.

To prevent the stuck condition of the sprinkler irrigation auxiliary support mechanism due to the uneven surface of the inclined embankment of the irrigation canal, which in turn causes that the hull 1 cannot move, as a further improvement of the present invention, a damping compression spring having a guide slipping mechanism is further disposed between the bottom end of the support leg 11 and the support roller group 12. One end of the damping compression spring is mounted on the support leg 11, and the other end of the damping compression spring is mounted on the support roller group 12. The damping compression spring enables the support leg 11 to be adaptively controlled according to the surface of the inclined embankment of the irrigation canal, thereby preventing the stuck condition of the sprinkler irrigation auxiliary support mechanism due to the uneven surface of the inclined embankment of the irrigation canal.

To achieve a more stable auxiliary support effect, the support roller groups 12 can be a plurality of support roller structures arranged at front and rear sides or the left and right sides, or can be a crawler wheel structure. The crawler wheel structure is preferred because it has a larger support area and can achieve a better support effect, that is, as a preferred version of the present invention, the support roller group 12 is a crawler wheel structure. The crawler wheel structure includes a crawler beam and a crawler belt. The crawler beam is mounted and coupled to the support leg 11. The support rollers are a plurality of crawler wheels hingedly mounted on the crawler beam, and the crawler belt is connected end-to-end in a loop and is sleeved on the crawler wheels.

To avoid the battery capacity affecting the control of the controller, as a further improvement of the present invention, the electric control device 3 further includes a solar collector plate and a solar charging control loop, and the solar collector plate is electrically connected to the controller and the controller battery pack, respectively.

The boat-shaped sprinkler irrigation machine for large-scale farm irrigation canals has a sprinkler irrigation auxiliary support mechanism on the hull 1, and the sprinkler irrigation auxiliary support mechanism includes support legs 11 symmetrically disposed on the left and right sides of the hull 1 and support roller groups 12 mounted at the bottom ends of the support legs 11. Therefore, when the boat-shaped sprinkler irrigation machine for large-scale farm irrigation canals is placed in an irrigation canal of a large-scale farm for use, the support roller groups 12 are erected on the surface of an inclined embankment of the irrigation canal from the left and right directions of the hull 1 by means of the support legs 11, and the propeller is immerged below the irrigation water surface. After the sprinkler irrigation control loop and the hull movement control loop start working, irrigation water in the irrigation canal enters the self-priming pump 21 through the suction pipe, is pressurized by the self-priming pump 21, and is sprayed by the sprinkler gun 23, and meanwhile, the propeller rotates to push the hull 1 to realize the sprinkler irrigation of the crops. The sprinkler irrigation auxiliary support mechanism can not only balance the recoil of the sprinkler gun 23 and prevent the hull 1 from tipping over, but also provide the movement guidance of the hull 1 and ensure that the hull 1 always moves along the running direction of the irrigation canal. Since the top ends of the support legs 11 are hingedly mounted on the hull 1, and since a telescopic lifting control member 13 is disposed between support legs 11 and the hull 1, a spacing between the support legs 11 in a lateral direction can be adjusted, thereby adapting to different irrigation canal widths. Since the support roller group 12 further includes a support roller drive, the rotation of the support rollers can be realized, and the passive rotation is converted into the active rotation, so that the support rollers can provide an auxiliary driving force during the traveling of the hull 1. Under the premise of the lifting operation of the telescopic lifting control member 13, the boat-shaped sprinkler irrigation machine for large-scale farm irrigation canals can walk on the ground. By providing a suitable slope on the irrigation canal, the boat-shaped sprinkler irrigation machine for large-scale farm irrigation canals can launch and land by itself, can completely avoid crushing the farmland crops while achieving sprinkler irrigation operations, and is especially suitable for the sprinkler irrigation of crops on the large-scale farms with irrigation canals.

What is claimed is:

1. A boat-shaped sprinkler irrigation machine for large-scale farm irrigation canals, the sprinkler irrigation machine comprising a hull, a driving power source, a traveling propulsion device, a sprinkler irrigation device, and an electric control device, the driving power source, the sprinkler irrigation device and the electric control device being disposed on the hull, wherein:

a sprinkler irrigation auxiliary support mechanism is disposed on the hull, and comprises support legs and support roller groups; the support legs are symmetrically disposed on left and right sides of the hull, and top ends of the support legs are mounted on the hull; the support roller groups correspond in number to the support legs, and are mounted on bottom ends of the support legs; and the support roller group comprises support rollers, and the support rollers are provided to roll back and forth;

the traveling propulsion device comprises a propeller disposed at a bottom portion of the hull, and the propeller is connected to the driving power source via a transmission mechanism;

the sprinkler irrigation device comprises a self-priming pump, a sprinkler frame, and a sprinkler gun; the self-priming pump is fixedly mounted on the hull, and a power input end of the self-priming pump is connected to the driving power source via the transmission mechanism, a suction port of the self-priming pump is connected to a suction pipe that is immerged below a liquid level of an irrigation canal, and a drainage port of the self-priming pump is connected to the sprinkler gun via a pipeline; the sprinkler frame is fixedly mounted on the hull in a position corresponding to a symmetrical center of the support legs, the sprinkler gun is fixedly mounted on the sprinkler frame by means of a sprinkler gun adjusting assembly, and the sprinkler gun adjusting assembly comprises a jet angle adjusting mechanism and a jet direction adjusting mechanism which can realize a rotary positioning operation of the sprinkler gun; and the electric control device comprises a controller, a controller battery pack, a hull movement control loop, and a sprinkler irrigation control loop, and the controller is electrically connected to the driving power source.

2. The boat-shaped sprinkler irrigation machine for large-scale farm irrigation canals according to claim 1, wherein the support leg is a telescopic structure, and comprises a body section, a telescopic section, and a support leg extension and retraction control member; a top end of the body section is mounted on the hull, the telescopic section is slidably and matingly connected to the body section, and the support leg extension and retraction control member is disposed in a length direction of the support leg; one end of the support leg extension and retraction control member is connected to the body section, and the other end of the support leg extension and retraction control member is connected to the telescopic section; a telescopic lifting control member is further disposed between the support leg and the hull; two ends of the telescopic lifting control member are hingedly connected to the hull and the body section of the support leg, respectively; the electric control device further comprises a support leg lifting control loop and a support leg extension and retraction control loop, and the controller is electrically connected to the support leg extension and retraction control member and the telescopic lifting control member, respectively.

3. The boat-shaped sprinkler irrigation machine for large-scale farm irrigation canals according to claim 2, wherein the telescopic lifting control member and the support leg extension and retraction control member are both hydraulic cylinder structures; the boat-shaped sprinkler irrigation machine for large-scale farm irrigation canals further comprises a hydraulic control device disposed on the hull; the hydraulic control device comprises a hydraulic pump station and a hydraulic control valve group; the hydraulic pump station comprises a hydraulic pump and a hydraulic oil tank; the hydraulic pump of the hydraulic pump station is connected to the driving power source via the transmission mechanism, and the hydraulic pump station is connected to the hydraulic control valve group via a hydraulic pipeline; the hydraulic control valve group is connected to the telescopic lifting control member and the support leg extension and retraction control member via the hydraulic pipeline, respectively; and the hydraulic control valve group is electrically connected to the controller of the electric control device.

4. The boat-shaped sprinkler irrigation machine for large-scale farm irrigation canals according to claim 1, wherein the support roller group further comprises a support roller drive, and an output end of the support roller drive is coaxially and fixedly connected to the support rollers; the electric control device further comprises a support roller drive control loop; and the controller is electrically connected to the support roller drive.

5. The boat-shaped sprinkler irrigation machine for large-scale farm irrigation canals according to claim 4, wherein the support roller drive is a roller hydraulic motor; the boat-shaped sprinkler irrigation machine for large-scale farm irrigation canals further comprises a hydraulic control device disposed on the hull; the hydraulic control device comprises a hydraulic pump station and a hydraulic control valve group; the hydraulic pump station comprises a hydraulic pump and a hydraulic oil tank; the hydraulic pump of the hydraulic pump station is connected to the driving power source via the transmission mechanism; the hydraulic pump station is connected to the hydraulic control valve group via a hydraulic pipeline; the hydraulic control valve group is connected to the roller hydraulic motor via the hydraulic pipeline; and the hydraulic control valve group is electrically connected to the controller of the electric control unit.

6. The boat-shaped sprinkler irrigation machine for large-scale farm irrigation canals according to claim 1, wherein the electric control device further comprises a shipboard industrial control computer, a hull position feedback sensor, a sprinkler gun jet angle control loop, and a sprinkler gun jet direction control loop; the shipboard industrial control computer is electrically connected to the controller via a data line, and comprises a sprinkler irrigation data input/output port; the controller is electrically connected to the jet angle adjusting mechanism and the jet direction adjusting mechanism of the sprinkler gun adjusting assembly, respectively; and the hull position feedback sensor is disposed at front and rear ends of the hull, and is electrically connected to the controller.

7. The boat-shaped sprinkler irrigation machine for large-scale farm irrigation canals according to claim 1, wherein there are at least four support legs; the four support legs are symmetrically disposed with respect to a center of the hull; and two support legs near a bow are inclined to extend forwards, and two support legs near a stern are inclined to extend rearwards.

8. The boat-shaped sprinkler irrigation machine for large-scale farm irrigation canals according to claim 1, wherein a damping compression spring having a guide slipping mechanism is further disposed between the bottom end of the support leg and the support roller group; one end of the damping compression spring is mounted on the support leg, and the other end of the damping compression spring is mounted on the support roller group.

9. The boat-shaped sprinkler irrigation machine for large-scale farm irrigation canals according to claim 1, wherein the support roller group is a crawler wheel structure; the crawler wheel structure comprises a crawler beam and a crawler belt; the crawler beam is mounted and connected to the support leg; the support rollers are a plurality of crawler wheels hingedly mounted on the crawler beam; and the crawler belt is connected end-to-end in a loop and is sleeved on the crawler wheels.

10. The boat-shaped sprinkler irrigation machine for large-scale farm irrigation canals according to claim 1, wherein the electric control device further comprises a solar collector plate and a solar charging control loop, and the solar collector plate is electrically connected to the controller and the controller battery pack, respectively.

* * * * *